United States Patent
Chang et al.

(10) Patent No.: US 9,322,947 B2
(45) Date of Patent: Apr. 26, 2016

(54) ACOUSTIC RECEIVER ASSEMBLY FOR DOWNHOLE TOOLS

(71) Applicant: Halliburton Energy Services, Inc., Houston, TX (US)

(72) Inventors: Chung Chang, Houston, TX (US); Abbas Arian, Houston, TX (US); Randall Bennett Jones, Sugar Land, TX (US); Gary Kainer, Tomball, TX (US); Arthur Cheng, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/400,767

(22) PCT Filed: Mar. 27, 2014

(86) PCT No.: PCT/US2014/032000
§ 371 (c)(1),
(2) Date: Nov. 12, 2014

(87) PCT Pub. No.: WO2014/160855
PCT Pub. Date: Oct. 2, 2014

(65) Prior Publication Data
US 2015/0136516 A1    May 21, 2015

Related U.S. Application Data

(60) Provisional application No. 61/806,109, filed on Mar. 28, 2013.

(51) Int. Cl.
*G01V 1/44* (2006.01)
*E21B 47/16* (2006.01)

(52) U.S. Cl.
CPC .. *G01V 1/44* (2013.01); *E21B 47/16* (2013.01)

(58) Field of Classification Search
CPC ........... G01V 1/523; G01V 1/44; E21B 47/16
USPC .................................................. 181/102, 106
See application file for complete search history.

(56) References Cited

U.S. PATENT DOCUMENTS 4,365,321 A * 12/1982 von Bose ......................... 367/25
4,446,539 A * 5/1984 von Bose ......................... 367/25
(Continued)

FOREIGN PATENT DOCUMENTS

WO    WO-2014160855 A1    10/2014

OTHER PUBLICATIONS

"International Application Serial No. PCT/US2014/032000, International Search Report mailed Aug. 6, 2014", 3 pgs.
(Continued)

*Primary Examiner* — Jeremy Luks
(74) *Attorney, Agent, or Firm* — Schwegman, Lundberg & Woessner, P.A.; Benjamin Fite

(57) ABSTRACT

The disclosure addresses acoustic receivers including an acoustic isolator structure, and an acoustic logging tool which incorporates the acoustic receiver. The acoustic receiver isolation structure is configured to minimize acoustic transmissions which could otherwise adversely affect acoustical measurements being made by an acoustic receiver. The described acoustic receiver includes a plurality of longitudinally arranged mass members coupled to a central supporting structure, in a configuration to reduce acoustic transmissions in at least selected frequency ranges.

23 Claims, 3 Drawing Sheets

(56) References Cited

U.S. PATENT DOCUMENTS

| | | | |
|---|---|---|---|
| 4,872,526 A * | 10/1989 | Wignall et al. | 181/102 |
| 5,229,553 A * | 7/1993 | Lester et al. | 181/102 |
| 5,728,978 A * | 3/1998 | Roberts et al. | 181/102 |
| 5,731,550 A | 3/1998 | Lester et al. | |
| 6,820,716 B2 | 11/2004 | Redding et al. | |
| 7,216,737 B2 | 5/2007 | Sugiyama | |
| 7,650,963 B2 | 1/2010 | Redding et al. | |
| 2003/0024761 A1* | 2/2003 | Tashiro et al. | 181/105 |
| 2003/0106739 A1 | 6/2003 | Arian et al. | |
| 2005/0034858 A1 | 2/2005 | Redding et al. | |
| 2005/0167101 A1 | 8/2005 | Sugiyama | |
| 2005/0173185 A1* | 8/2005 | Pabon et al. | 181/108 |
| 2008/0149415 A1 | 6/2008 | Botting | |
| 2009/0107757 A1 | 4/2009 | Lindner et al. | |

OTHER PUBLICATIONS

"International Application Serial No. PCT/US2014/032000, Written Opinion mailed Aug. 6, 2014", 6 pgs.

"Application Serial No. PCT/US2014/032000, International Preliminary Report on Patentability mailed Oct. 8, 2015", 8 pgs.

* cited by examiner

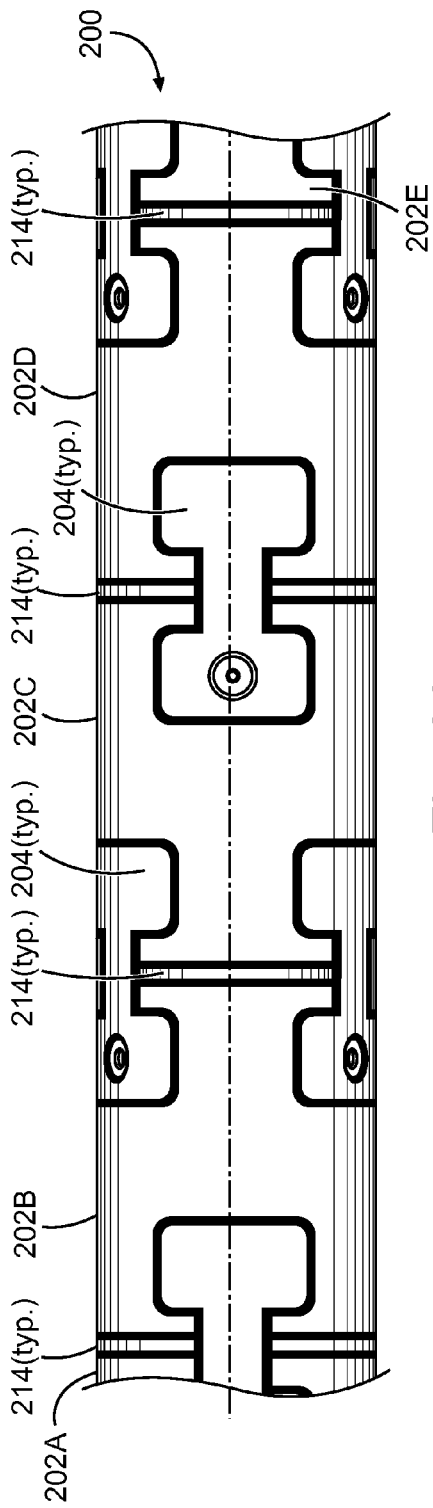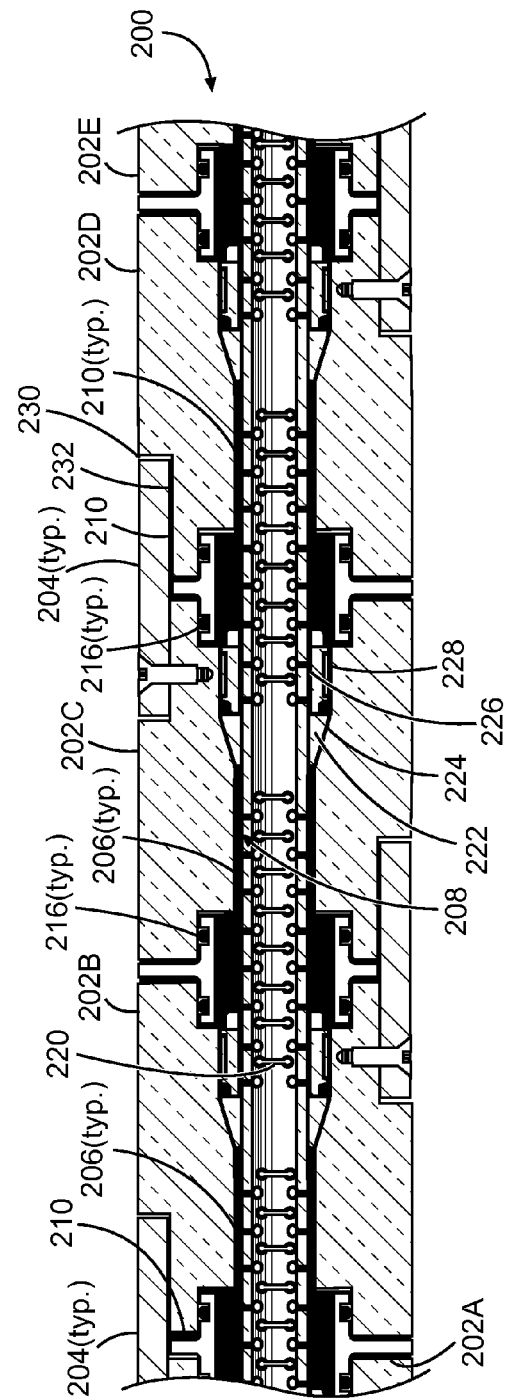
Fig. 2A
Fig. 2B

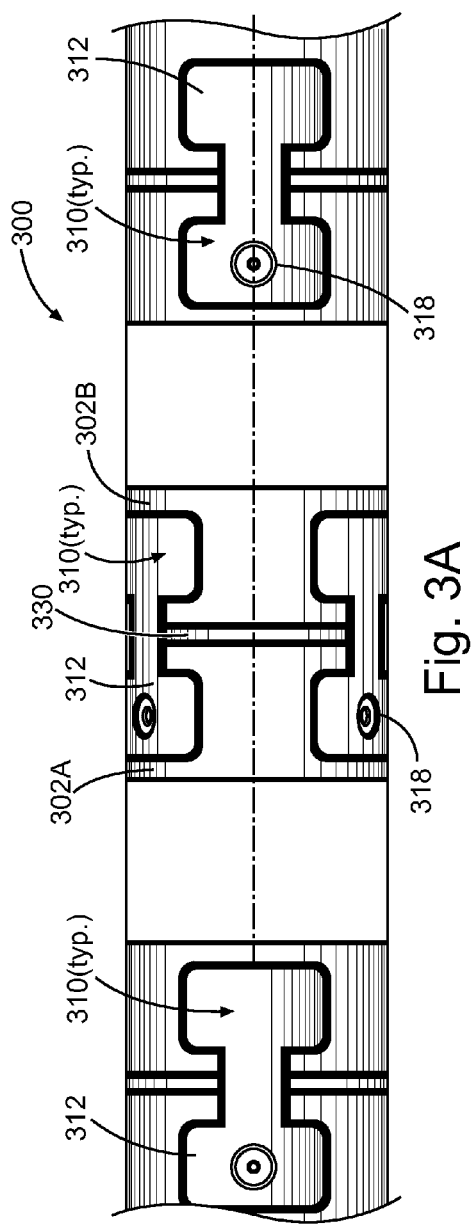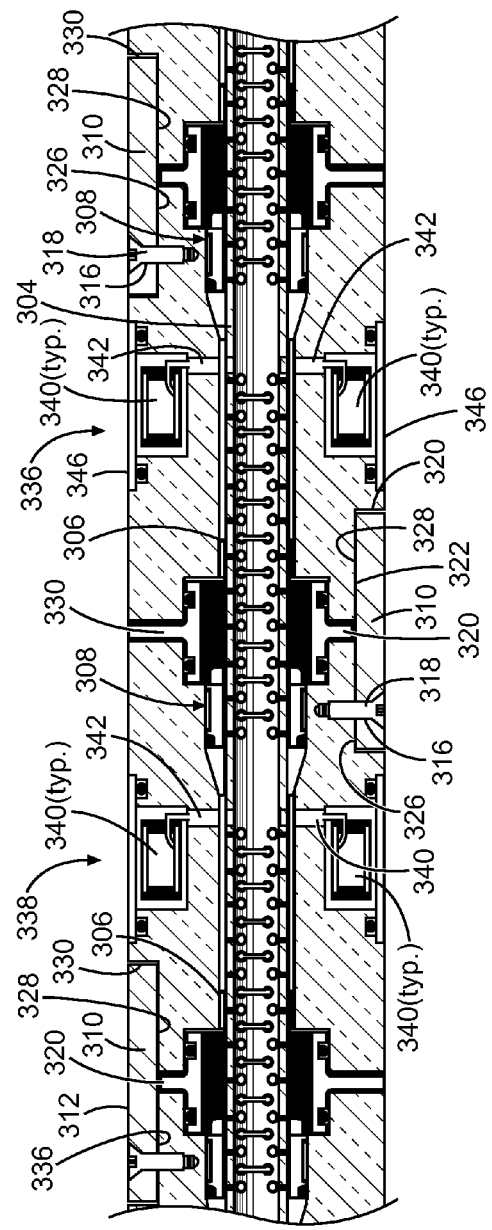

ACOUSTIC RECEIVER ASSEMBLY FOR DOWNHOLE TOOLS

CLAIM OF PRIORITY

This application is a U.S. National Stage Filing under 35 U.S.C. 371 from International Application No. PCT/US2014/032000, filed on 27 Mar. 2014, and published as WO 2014/160855 A1 on 2 Oct. 2014, which application claims the benefit of U.S. Provisional Application Ser. No. 61/806,109, filed on Mar. 28, 2013; which applications and publication are incorporated by reference herein in their entirety.

TECHNICAL FIELD

The present application relates generally to an acoustic receiver assembly for downhole tools; and more particularly relates to a receiver assembly providing improved isolation of the receivers from undesired vibrations propagating through the tool.

BACKGROUND

A wide variety of logging tools are often used to evaluate parameters of that a wellbore being drilled, the formation surrounding that wellbore, and/or the fluids within the wellbore. Where such logging tools rely upon acoustical measurements, there is often a need to isolate the sensors of acoustical signals from other components within the logging system. One clear example of such tools are acoustic logging tools which generate acoustic signals through a transmitter at one location on the tool (or in the tool string) and which travel through the formation to a receiver at a spaced location on the tool. Depending on the tool, the receiver may be spaced a few feet from the transmitter, or may be spaced 20 feet or more from the transmitter.

When such a system is operated, different types of waves propagate within the well and/or formation, including pressure waves (P-waves), shear waves (S waves), Rayleigh waves, mud waves and Stoneley waves. Of these wave types, P-waves and S-waves in particular, if unimpeded, can propagate along the body of the acoustic logging tool in a manner that would mask or otherwise adversely affect measurements by the acoustic receiver. Accordingly, there is a need to attenuate and/or slow down such propagation along the logging tool body so as to not adversely affect the measurements being made at the receiver. In particular, in some embodiments it would be preferable to provide such acoustic isolation in the area most proximate the acoustic receivers.

BRIEF DESCRIPTION OF THE DRAWINGS

Some embodiments are illustrated by way of example and not limitation in the following figures, in which:

FIG. 2A-2B depict an example acoustic isolation structure, depicted in FIG. 2A from an external view; and depicted in FIG. 2B in a cross-sectional view.

FIGS. 3A-B depict an acoustic isolation structure operating in accordance with the isolation structure of FIGS. 2A-B, but having a plurality of receiver assemblies integrated with the isolation structure, depicted in FIG. 3A in an external view, and in FIG. 3B in a cross-sectional view along the depicted line in FIG. 3A.

DETAILED DESCRIPTION

Figure 1:
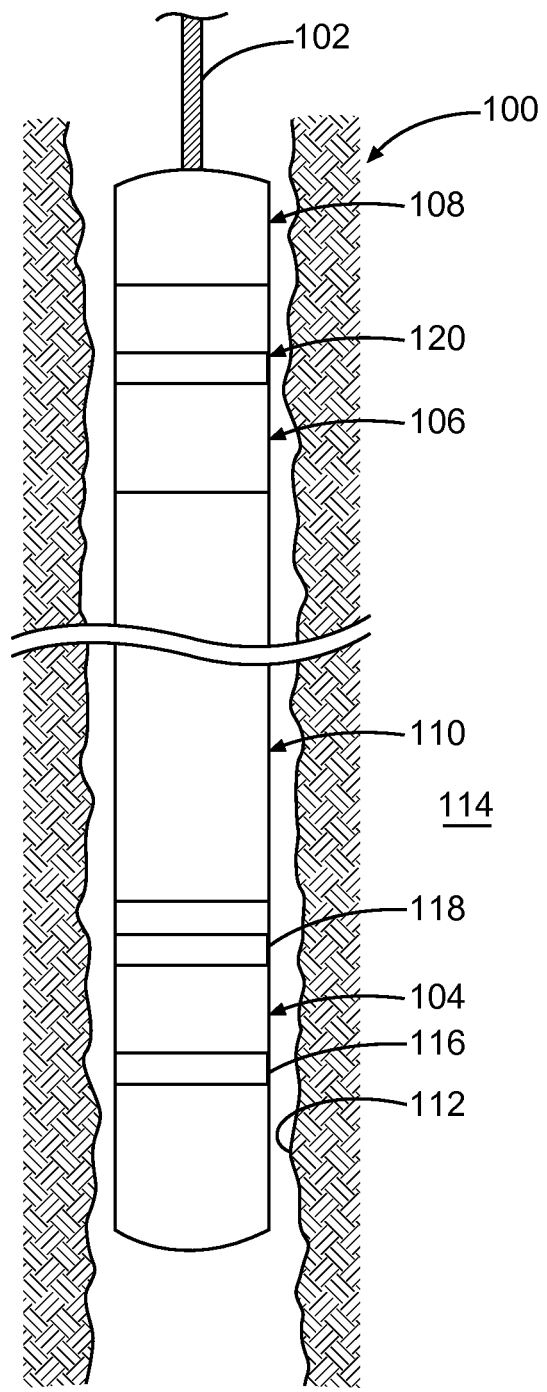
FIG. 1 depicts a schematic representation of an acoustic logging tool on an example configuration that can benefit from the methods and apparatus described herein.

The following detailed description describes example embodiments of the disclosure with reference to the accompanying drawings, which depict various details of examples that show how the disclosure may be practiced. The discussion addresses various examples of novel methods, systems and apparatuses in reference to these drawings, and describes the depicted embodiments in sufficient detail to enable those skilled in the art to practice the disclosed subject matter. Many embodiments other than the illustrative examples discussed herein may be used to practice these techniques. Structural and operational changes in addition to the alternatives specifically discussed herein may be made without departing from the scope of this disclosure.

In this description, references to "one embodiment" or "an embodiment," or to "one example" or "an example" in this description are not intended necessarily to refer to the same embodiment or example; however, neither are such embodiments mutually exclusive, unless so stated or as will be readily apparent to those of ordinary skill in the art having the benefit of this disclosure. Thus, a variety of combinations and/or integrations of the embodiments and examples described herein may be included, as well as further embodiments and examples as defined within the scope of all claims based on this disclosure, as well as all legal equivalents of such claims.

For clarity of illustration, the structure and function to achieve acoustic isolation will first be described independent of the receiver assemblies. Then, in reference to FIGS. 3A-B, and example receiver assembly in combination with the acoustic isolation structure will be discussed.

The present disclosure addresses multiple embodiments of an acoustic receiver with acoustic isolation, and an acoustic logging tool which incorporates the acoustic receiver. The acoustic isolator structure of the receiver is configured to minimize acoustic transmissions which could otherwise adversely affect acoustical measurements being made by the acoustic receiver. The described acoustic receiver structures include a plurality of longitudinally arranged mass members coupled to a central supporting structure. In the depicted examples, both the central supporting structure and the mass members are configured to allow the acoustic receiver to provide some degree movement or deflection within the isolator, such as relative longitudinal movement between adjacent mass blocks and/or some degree of axial deflection over a range of motion. In the depicted examples this movement or deflection is facilitated in part by cooperative configuration of the structures used to couple each mass member to another mass member.

FIG. 1 depicts a schematic representation of an acoustic logging tool 100. Logging tool 100 is suspended from a wireline 102 through use of a cable head assembly 108, in one example operating configuration well-known in the art. Acoustic logging tool 100 is suspended within a borehole 112 penetrating a formation 114. In other examples, acoustic logging tool 100 might be incorporated into a tubular string, which may be for example, in a logging while drilling (LWD) drillstring disposed within a wellbore to perform drilling or reaming operations. In either configuration or form of operation, the various mechanisms and methods for providing power and/or signals to the logging tool, and for processing of signals received by the logging tool are well known to those skilled in the art.

Acoustic logging tool 100 includes a transmitter section, indicated generally at 104, housing acoustic transmitters 116 and 118. While in the depicted tool two transmitters are shown, either only a single transmitter or more than two transmitters may be utilized. Such transmitters may be constructed similarly to one another, or different configurations of transmitters known to those in the art may be utilized. In some example systems, one or more of the provided transmitters may be configured to emit acoustic signals essentially around the circumference of the transmitter section 104.

Acoustic logging tool 100 also includes a receiver section, indicated generally at 106; which in this depicted tool includes only a single receiver, indicated generally at 120. As with transmitters, either a greater or lesser number of receivers may be provided, and such receivers can either be a single configuration or of multiple configurations. In some example systems, multiple receivers will be angularly disposed around the lateral periphery of the receiver section. For example, a group of eight receivers might be disposed in essentially a single plane that extends generally perpendicular to the longitudinal axis through acoustic logging tool 100, with the receivers oriented at essentially 45° increments around the tool periphery. This receiver section will also include acoustic isolation structures, as will be discussed in reference to FIGS. 3A-B.

As can be seen from the schematic representation of FIG. 1, transmitter section 104 is retained in spaced relation relative to receiver section 106 through an acoustic isolation section, indicated generally at 110. Acoustic isolation section 110 can be constructed, for example, in accordance with the example embodiment as will be discussed with respect to FIGS. 2A-B. Acoustic isolation section 110 does not need to be entirely of a structure providing acoustic isolation along its entire length; as once an acoustical path is defined which is sufficiently disrupted, or which sufficiently retards or attenuates the problematic acoustic signals, then additional structures may be provided as needed for other purposes, for example to establish the desired spacing between the transmitter section 104 and receiver section 106. As will be apparent to those skilled in the art, there can be two sources of energy propagating through an acoustic logging tool: energy resulting directly from the transmitter(s) or other components and propagating directly through the tool string; and energy external to the tool recoupling to the logging tool through the borehole fluid. Accordingly, in many example systems, it will be desirable to have acoustic isolation provided proximate the receivers to minimize this latter form of propagating energy.

Referring now to FIGS. 2A-B, the figures depict a portion of an acoustic isolator 200 such as could advantageously be used in logging tool 100 of FIG. 1. Acoustic isolator 200 has an exterior surface formed of a plurality of mass blocks 202A-E, which are coupled together by "dog-bone"-shaped connectors, as indicated at 204. Each mass block 202 is a structural element which may be formed of a suitable, relatively higher mass, material. For example metal or metallic compounds, such as stainless steel, Iconel alloys, or tungsten, can be used, as well as many other comparable materials providing appropriate strength and weight which will be apparent to those skilled in the art having the benefit of this disclosure.

Each mass block 202 contains a respective central bore 206 which cooperatively form a central passageway, indicated generally at 208, when the mass blocks 202 are assembled as shown. Each mass block 202 also contains a plurality of appropriately configured recesses, as indicated typically at 210, proximate an external surface, each recess 210 configured to engage a respective portion of a dog bone connector 204. In most examples, even after coupling of the mass blocks together through a dog bone connector 210, the relative configuration of the dog bone connectors 204 and the recesses 210 provides some degree of longitudinal movement, and preferably also some degree of axial deflection, between adjacent mass blocks 202, The depicted "dog bone" shaped connector is only one example of a connector that may be utilized to enable the identified longitudinal movement and/or axial deflection over a range of motion. The function of this movement and/or deflection will be addressed later herein. In other examples, also as will be addressed later herein, the dog bone connectors may be coupled, such as through bolts, to both of two adjacent mass blocks. Other configurations of connectors can be envisioned. In many such alternative configurations, both space efficiency and secure limiting of the maximum motion will achieved through use of connector components that have regions of a relatively greater dimension that engage each mass block relative to the dimension of a central region that extends between the two mass blocks.

As can also be seen in FIGS. 2A-B in some examples, each dog bone connector 204 will be rigidly coupled to only one mass block 210. In most embodiments, each dog bone connector 204 is configured with a convex external profile such that when the connector is an operating configuration, as depicted in FIGS. 2A-B, a generally uniform cylindrical surface is exposed. In many examples, the recess and dog bone connector will be cooperatively formed to facilitate the described longitudinal movement and axial deflection, while at the same time limiting torsional movement. For example, the dog bone connector and the recess may define both a longitudinally extending gap 232 and an axially extending gap 230 to accomplish such. The dimensions of these gaps (and the dimension of the space between joined mass blocks) may be configured to achieve a desired design balance between a maximum logging load limit (increased by relatively increased gap dimensions) and a maximum radius of curvature of the tool structure (restricted by relatively reduced gap dimensions).

Each mass block 202 is spaced from an adjacent mass block 202 by an elastomeric member 214 providing a resilient seal between the adjacent mass blocks 202. As can be seen in FIG. 2B, in some configurations the elastomeric member 214 may have provisions for additional seals, such as o-ring seals, as indicated generally at 216. This resulting spacing between mass blocks avoids a vibration path between blocks. In some examples, the elastomeric members 214 might be constructed to enhance the acoustic isolation between the mass blocks.

Referring now particularly to FIG. 2B, each mass block 202 is assembled in a respective fixed position relative to a slotted central tube 218, which extends through passageway 208 formed by individual bores 206 in each mass block 202. Central tube 218 is again formed of a structural material, such as an Iconel alloy, and includes a plurality of slots, as indicated typically at 220. As can be seen in the Figure, in this example, the slots are arranged in both longitudinally and radially spaced relation around all sides of the central tube, and each aperture radially overlaps with at least one longitudinally adjacent aperture. Thus, slots 220 are sized and arranged to define a nonlinear path for vibrations traversing central tube 218. For example, in the depicted example, slots are presented in pairs on opposing sides of central tube 218, and the next adjacent slots are also presented in pairs on opposing sides of central tube 218, but are positioned at a 90° offset from the preceding slots. Additionally, the slots are of dimensions such that they overlap one another so as to preclude a linear path for vibrations. Many other configurations and/or dimensions of slots, or other structural configurations to provide only a nonlinear vibrational path through central tube 218, might be utilized in place of the depicted structure. One advantage of the described slot configuration is that it also facilitates (and allows control of) the flexing of central tube 218, and thereby the relative deflection of the mass blocks secured to the tube.

Each mass block 202 is structurally secured to central tube 218 through a locking wedge 222 (which in many examples will have a discontinuity to facilitate compression of the wedge) which is compressed against an inclined shoulder 224 defining a portion of each mass block central bore 206. This compression is achieved through an annular locking nut 226 which threadably engages, at 228, a respective mass block 202. As will be apparent to those skilled in the art, increased threaded engagement of annular locking nut 226, causes wedge block 222 to compress against central tube 218, serving to both secure mass block 202 to central tube 218, and to also acoustically couple the mass block to the central tube.

As a result of the above-described structure, the only direct acoustic path through the acoustic isolator 200 is along the slotted central tube 218. In this configuration of acoustic isolator 200, the flexural slowness is a function of the transverse motion of the mass and of the spring structure provided by the described structure. Some example configurations in accordance with the example structure described herein should be able to achieve a flexural wave slowness of at least 2500 microseconds per foot. Additionally, the mass and spring structure achieved by acoustically isolated mass blocks coupled to a flexible central tube defining a nonlinear acoustic path can be configured to mechanically filter out high-frequency flexural tool wave components, and to allow essentially only low flexural tool wave frequencies, for example below 200 Hz, to propagate along the spacer.

In other examples, dampening of the center tube and/or of the central fluid path there through may be provided. For example, a dampening member may be placed to engage the center tube, such as a coating or sleeve of tungsten rubber might be provided on either the interior or exterior surface of the central tube (218), to further attenuate any waves traveling down the tube. In some examples, it may also be desirable to attenuate any Stonely wave energy in the fluid channel within the central tube, or in other passageways in the system. Sintered metal may be provided in the central tube, or in any other passageway in the tool, to allow fluid and pressure communication while attenuating such energy. The permeability of such sintered metal may be selected in a manner known to those skilled in the art. For example, (referring to FIG. 3), sintered metal may be placed in passageways 342, where it will help isolate any acoustic energy traveling in the central tube 304 from reaching the receiver assemblies 340.

As noted previously, the configuration of the dog bone connectors with the respective recesses 210 in each mass block 204 allow acoustic isolator 204 to deflect over a range of motion to a selected point. Once the flexing between two adjacent mass blocks reaches that selected point, each dog bone connector will engage surfaces defining the recess of the respective mass blocks, and the system will then become more rigid. In one example configuration, the central tube 218 can be configured to accept over 2300 pound loads, and the flexing that comes therewith, before the dog bone connectors and mass blocks fully engage one another to significantly increase stiffness, tensile strength, and torsional strength of the acoustic isolator.

In the depicted example, a plurality of mass blocks is provided at each of a plurality of longitudinal positions along the acoustic isolator. In this example, at a first longitudinal location three dog bone connectors (and the associated structures) are provided at 120 degree circumferential spacings relative to one another. And also in this example, at the next longitudinal location, there are again three dog bone connectors (and associated structures) at 120 degree circumferential relative spacing, but the orientation is offset 60 degrees from the connectors at each of the longitudinally adjacent longitudinal locations (i.e., those next "above" and "below"). Of course other distributions of connectors may be used in different examples.

Referring now to FIGS. 3A-B, the figures depict a representative portion of an example acoustically-isolated receiver section 300 as might be used in acoustic logging tool 100 of FIG. 1. The acoustic isolation mechanisms of receiver section 300 function in accordance with the description provided relative to FIGS. 2A-B, and so will not be addressed in equal detail in reference to receiver section 300.

Receiver section 300, in the depicted portion, includes two mass blocks 302A and 302B, secured to a central tube 304 extending through central apertures 306 in each mass block 302. Each mass block 302 is again coupled to central tube 304 by a respective lock nut and wedge assembly, as indicated generally at 308. The general structure and function of these lock nut and wedge assemblies 308 corresponds to that described relative to FIGS. 2A-B. Again, an elastomeric member 330 is retained between the mass blocks 302 to prevent entry of contaminants into the area surrounding central tube 304.

Mass blocks 302A and 302B (as well as other mass blocks not depicted) are coupled by an alternative configuration of dog bone connector assemblies, as indicated typically at 310. This can best be seen in FIG. 3B. Each dog bone connector assembly 310 includes a dog bone body 312 which is secured within a recess 326 in a first mass block (e.g., 302A) by one or more bolts 318 extending through an aperture 316 in dog bone body 312, as the dog bone body also engages a recess 328 in an adjacent another mass block (e.g., 302B), as described relative to FIGS. 2A-B. It should also be understood that each dog bone connector assembly can be a more complex assembly, with additional or different structures configured to provide the physical connection to either or both mass blocks engaged by the connector assembly, while facilitating both the relative movement to allow flexing of the acoustic isolation structure within a desired range, while maintaining the structural integrity of the structure. In this example configuration, dog bone body 312 includes a relief indicated generally at 320 in an inner surface where it will extend within a recess 328 in the mating mass block (320B), the relief 320 defining a gap 322 between the two components. In this example, an elastomeric sealing material is provided within gap 322 to prevent intrusion of contaminants. Additionally, an axially extending gap 330 will preferably exist between dog bone body 312 and recess 328. As described in reference to the preceding figures, the cooperative configurations of each dog bone assembly and the recesses which they engage, including gaps 322 and 330, will facilitate longitudinal movement and axial deflection of the two mass blocks relative to one another.

Receiver section 300 includes a plurality of receivers, with a first group, indicated generally at 336, arranged essentially in a first plane extending perpendicular to the longitudinal axis through receiver section 300 and a second group, indicated generally at 338, arranged essentially in a second plane at a longitudinally spaced position relative to the first plane. Each group includes a plurality of receiver assemblies, typically indicated at 340, which may be distributed around the circumference of receiver section 300 as desired, subject primarily to potential restrictions resulting from the size of the receivers. In the depicted example, each group of receivers includes four receivers, of which only two are visible in the cross-section of FIG. 3B. All receiver assemblies 340 will be of one or more conventional constructions as are known to persons skilled in the art.

Each receiver assembly 340 will be housed within one or more cavities formed in a respective mass block 302. The particular size and configuration of each such cavity will be configured to be suitable for the receiver assembly to be housed. Preferably, one or more passageways, as indicated at 342, will be provided between each receiver cavity and a respective central aperture 306 in the surrounding mass block to provide pressure equalization between the receiver cavity and the bore 306 surrounding central tube 304. Each receiver assembly will preferably be covered by a relatively acoustically inert protective member 346. In some case, the protective member 346 may be a generally annular member, in some examples having a split therein to facilitate assembly, that may be secured (such as by bolts or another structure) to sealingly engage a respective mass block housing a group of receiver assemblies 342. The protective member 346 may be formed of a suitable material both to minimize interference with the acoustic signals to be detected and to withstand the wellbore environment. For example, one suitable material is PEEK, as is well known in the industry for such applications.

As an alternative configuration, the dog bone body 312 of each dog bone connector assembly 310 is not required to be cantilevered from one mass block 302 to the other; but may be boltably coupled to both mass blocks, with suitable gaps or other provisions, such as gaps around each bolt, to enable a selected degree of movement between the mass blocks.

In the foregoing Detailed Description, it can be seen that various features are grouped together in a single embodiment for the purpose of streamlining the disclosure. This method of disclosure is not to be interpreted as reflecting an intention that embodiments of the invention necessarily require all or even multiple of such features.

What is claimed is:

1. An acoustic receiver for use in a downhole environment, comprising:
   a linear central structure defining a non-linear acoustic path along at least a portion of its length;
   a plurality of mass members coupled to the central structure along at least a portion of its length, each mass member coupled in spaced relation to an adjacent mass member, and physically and acoustically coupled to the central structure;
   a plurality of coupling mechanisms, each coupling mechanism coupling a respective mass member to a respective adjacent mass member, wherein each coupling mechanism facilitates relative movement between the respective coupled mass members within a range of motion, and precludes relative movement beyond such range of motion; and
   at least one receiver assembly supported by at least one of the mass members.

2. The acoustic receiver of claim 1, wherein at least a portion of the plurality of coupling mechanisms each comprises a member which engages complementary recesses in a pair of adjacent mass members, and wherein the member has a greater outer surface width at a location where it engages the recesses then it has at a central portion extending between the coupled mass members.

3. The acoustic receiver of claim 2, wherein the complementary recesses are sized to provide a gap adjacent a coupling member to facilitate flexure of the acoustic receiver.

4. The acoustic receiver of claim 2, wherein each coupling mechanism is a generally dog bone-shaped member.

5. The acoustic receiver of claim 1, wherein the nonlinear acoustic path through the linear central structure is achieved by a series of apertures in the central structure, the apertures arranged to eliminate a linear acoustic path through at least a portion of the length of the central structure.

6. The acoustic receiver of claim 5, the linear central structure is a tube, and wherein in the apertures are generally linear and are arranged in spaced relation around all sides of the tube, and wherein each aperture radially overlaps with at least one longitudinally adjacent aperture.

7. The acoustic receiver of claim 1, wherein the receiver is contained within a recess in the mass member.

8. The acoustic receiver of claim 1, further comprising a plurality of receiver assemblies housed in recesses in one or more of the mass members.

9. The acoustic receiver of claim 1, wherein the receiver is located in a mass member, and radially offset from the linear central structure.

10. An acoustic receiver, comprising:
    a generally linear central tube defining a non-linear acoustic path along at least a portion of its length;
    a plurality of mass members, each mass member defining a central aperture engaging the central tube, with each mass member physically and acoustically coupled to the central tube, each mass member coupled in spaced relation to an adjacent mass member, each mass member including a plurality of radially offset coupling recesses;
    a plurality of elastomeric members, each elastomeric member placed between longitudinally adjacent mass members;
    a plurality of coupling mechanisms, each coupling mechanism engaging the coupling recesses of a pair of longitudinally adjacent mass members, wherein each coupling mechanism facilitates relative movement between the respective coupled mass members within a range of motion, and precludes relative movement beyond such range of motion; and
    a plurality of receiver assemblies, each receiver assembly supported in a recess in one of the mass members.

11. The acoustic receiver of claim 10, wherein the central tube comprises a plurality of generally linear apertures in at least a portion of the central tube, and wherein the apertures are arranged in both longitudinally and radially spaced relation around all sides of the central tube, and wherein each aperture radially overlaps with at least one longitudinally adjacent aperture.

12. The acoustic receiver of claim 10, further comprising a plurality of wedge assemblies, each wedge assembly mechanically engaging a respective mass member and the central tube to establish the physical and acoustic coupling of the mass member to the central tube.

13. The acoustic receiver of claim 10, further comprising a dampening member engaging the central tube.

14. The acoustic receiver of claim 10, further comprising sintered metal placed in the central tube.

15. The acoustic receiver of claim 10, wherein the coupling recesses are sized to provide a gap adjacent a coupling member engaging the recess to facilitate flexure of the acoustic isolator.

16. The acoustic receiver of claim 10, wherein each coupling mechanism comprises a coupling member which engages the coupling recesses in a pair of longitudinally adjacent mass members, and wherein the coupling member has a greater width at a location where it engages the recesses than it has at a central portion extending between the coupled mass members.

17. The acoustic receiver of claim 10, wherein a coupling member is bolted to at least one of the engaged mass members, and engages the coupling recesses of each mass member.

18. The acoustic receiver of claim 10, wherein the isolator is configured to filter high-frequency flexural tool wave components, and to allow flexural wave frequencies below 200 Hz to propagate through the isolator.

19. The acoustic receiver of claim 10, wherein at least one mass member comprises a plurality of receiver assemblies housed within at least one recess in the mass member.

20. The acoustic receiver of claim 10, further comprising a plurality of elastomeric seals, with each seal placed between a respective pair of mass members to prevent a vibration path between adjacent mass members.

21. The acoustic receiver of claim 10, further comprising sintered metal placed in a passageway in the receiver.

22. An acoustic logging tool, comprising:
at least one acoustic transmitter;
at least one acoustic receiver; and
an acoustic isolator placed between the acoustic transmitter and the acoustic receiver, the acoustic isolator including,
a linear central member defining a non-linear acoustic path along at least a portion of its length;
a plurality of mass members, each mass member defining a central aperture engaging the central tube, with each mass member physically and acoustically coupled to the central tube in spaced relation to an adjacent mass member, wherein each acoustic receiver is housed within a recess in one of the mass members; and
a plurality of coupling mechanisms, each such coupling mechanism coupling a respective mass member to a respective adjacent mass member, wherein each coupling mechanism facilitates relative movement between the respective coupled mass members within a range of motion, and precludes relative movement beyond such range of motion.

23. The acoustic logging tool of claim 22, wherein the acoustic logging tool is a wireline-conveyed logging tool.

* * * * *